UNITED STATES PATENT OFFICE.

HENRY M. BRIGHAM, OF BROOKLYN, NEW YORK, ASSIGNOR TO AMERICAN LINSEED COMPANY, A CORPORATION OF NEW JERSEY.

ARTIFICIAL FUEL AND METHOD OF MAKING SAME.

1,313,876. Specification of Letters Patent. Patented Aug. 26, 1919.

No Drawing. Application filed February 23, 1918. Serial No. 218,661.

*To all whom it may concern:*

Be it known that I, HENRY M. BRIGHAM, a citizen of the United States, and a resident of the borough of Brooklyn, in the city of New York, county of Kings, and State of New York, have invented certain new and useful Improvements in Artificial Fuel and Methods of Making Same, of which the following is a specification.

The objects of my invention are to produce an artificial fuel which may be easily ignited, is rich in heat units, produces a high heat, does not fuse while burning and leaves a minimum of residue or ash when consumed.

With these objects in view I place approximately ninety-two parts of dehydrated ethyl alcohol in a suitable vessel and add approximately fourteen parts of acetone and agitate until the acetone is thoroughly mixed with the ethyl alcohol. I then add approximately eight parts of cellulose having a content of nitrogen which renders it soluble in the mixture, preferably cellulose-pentanitrate, and agitate until it has been dissolved. I then continue the agitation and add sufficient commercial ethyl alcohol, which preferably contains about five per cent. of water, until the colloid is brought to the desired degree of viscosity. The colloid thus obtained may then be solidified into a firm solid jelly by the addition of water or commercial ethyl alcohol which contains a percentage of water. A convenient method is to pour the colloid into shallow pans and immerse in ethyl alcohol or water. The solidified colloid may then be cut into tubes of suitable size. The proportions above mentioned may be varied without departing from the spirit of this invention.

The resultant product does not fuse while burning, is rich in heat units, produces a high heat, leaves a minimum of ash or residue when consumed and its flame is readily extinguished.

I claim:

1. An artificial fuel comprising ethyl alcohol, acetone, cellulose having a nitrogen content which renders it soluble in a mixture of ethyl alcohol and acetone, and water.

2. An artificial fuel comprising cellulose-pentanitrate, ethyl alcohol, acetone and water.

3. The process of producing artificial fuel which consists in dissolving in a mixture of dehydrated ethyl alcohol and acetone, cellulose having a nitrogen content which renders it soluble therein, and solidifying the colloid so formed with water.

4. The process of producing artificial fuel which consists in dissolving in a mixture of dehydrated ethyl alcohol and acetone, cellulose having a nitrogen content which renders it soluble therein, and solidifying the colloid so formed with a mixture of water and commercial ethyl alcohol.

5. The process of producing artificial fuel which consists of dissolving cellulose-pentanitrate in a mixture of dehydrated ethyl alcohol and acetone and solidifying the colloid so formed with water.

6. The process of producing artificial fuel which consists in dissolving cellulose-pentanitrate in a mixture of dehydrated ethyl alcohol and acetone and solidifying the colloid so formed with commercial ethyl alcohol.

7. The process of producing artificial fuel consisting of mixing dehydrated ethyl alcohol and acetone, adding cellulose having a nitrogen content which renders it soluble therein and agitating the mixture to cause dissolving of the cellulose, and adding to such mixture sufficient commercial alcohol to bring the colloid to the desired degree of viscosity.

Signed at New York city, in the county of New York and State of New York, this 18th day of January, 1918.

HENRY M. BRIGHAM.

Witnesses:
MARGARET A. STECK,
PAUL R. JAMES.